United States Patent

[11] 3,595,131

[72] Inventors: Frantisek Rozanek;
Oldrich Brabec; Jaroslav Chmelik;
Miroslav Malek; Lubomir Kres; Ivan
Kraus, all of Plzen, Czechoslovakia
[21] Appl. No. 794,182
[22] Filed Jan. 27, 1969
[45] Patented July 27, 1971
[73] Assignee SKODA oborovy podnik
Plzen, Czechoslovakia
[32] Priority Jan. 24, 1967
[33] Czechoslovakia
[31] 537-67
Continuation-in-part of application Ser. No. 700,173, Jan. 24, 1968, now abandoned.

[54] METHOD OF MACHINING CRANK STRUCTURES
9 Claims, 8 Drawing Figs.
[52] U.S. Cl. .................................................. 90/13.9, 51/105
[51] Int. Cl. .................................................. B23c 1/18
[50] Field of Search .................................................. 90/11.3, 13.9, 13.99, 13, 15; 51/105 SP, 105 EC

[56] References Cited
UNITED STATES PATENTS
1,649,109  11/1927  Gifford et al. ................. 90/13.9 X
1,919,290  7/1933   Christman ..................... 90/13.9

Primary Examiner—Gil Weidenfeld
Attorney—Richard Low

ABSTRACT: A method of machining a crank structure and in particular a crankpin. During machining of the crankpin it is rotated about a predetermined axis which extends parallel to the axis of the crankpin. A milling cutter is maintained in engagement with the crankpin and rotated synchronously therewith, and the milling cutter is simultaneously rotated about its own axis so as to effect the cutting operations while the milling cutter turns simultaneously and synchronously with the crankpin. The axis of the milling cutter extends perpendicularly to the axis of the crankpin and is initially displaced beyond the crankpin axis during a rough cutting operation where a cutting end face of the milling cutter engages the crankpin, this end face being situated in a plane perpendicular to the axis of the milling cutter. During a finish cutting operation the axis of the milling cutter is displaced so as to perpendicularly intersect the axis of the crankpin, and the milling cutter and crankpin are again turned synchronously through the circular paths.

František Rožánek, Oldřich Brabec,
Jaroslav Chmelík, Miroslav Málek,
Lubomír Kreš, Ivan Kraus
INVENTORS František Rožánek, Oldřich Brabec,
Jaroslav Chmelík, Miroslav Málek,
Lubomír Křeš, Ivan Kraus
INVENTORS

METHOD OF MACHINING CRANK STRUCTURES

CROSS-REFERENCE TO RELATED APPLICATION

This application is a continuation-in-part of our copending application Ser. No. 700,173, filed Jan. 24, 1968, now abandoned and entitled MILLING OF CRANKPINS OR CRANKSHAFT ARMS.

BACKGROUND OF THE INVENTION

The present invention relates to the machining of crankpins as well as to the machining of such crankpins which form part of a crankshaft. Our method deals also with the machining of other parts of a crankshaft.

During conventional machining of crankpins and arms of a crankshaft, a great machining allowance is provided for technical reasons. In order to machine this allowance a so-called "Moll-apparatus" is used for the most part. In these machines the crankshaft is clamped and maintained stationary while one or, at the most, two cutters travel around a crankpin during the machining. Machines of this latter type are exceedingly expensive and have only a low output capacity.

According to another known method, disc-shaped cutters of extremely large diameter are used for milling the crankpins. Such machines have a greater output capacity but are still extremely expensive. The cutters in particular are of extremely high cost because of their large diameters which may be up to 2500 mm., and maintenance and sharpening require an exceedingly long time so that the cost in connection with the operations here involved are very high.

It is also known to machine crankpins on lathes. With such an arrangement the crankshaft is clamped so that it can turn around the axis of the crankpin. The main disadvantage of this type of machining operation is that the main axis of the crankshaft, coinciding with the axis of the journals thereof, is eccentric to the axis of the crankpin around which the crankshaft is rotated so that counterbalancing by a suitable weight is essential. While it is possible to machine the crankpins with conventional cutting tools, some machines use milling cutters instead of ordinary cutting tools. Where milling cutters are used the crankpin rotates only at a speed corresponding to the magnitude of the conventional feed speed used during milling operations.

Also, it is possible to machine crankpins on a pair of lathes. The crankshaft is clamped along one longitudinal axis while a pattern or a template type of crankshaft is clamped along the second axis, and the rotation of both the template and the actual crankshaft are synchronized by an arm which has a relatively wide suitably adjusted cutting tool for machining the crankpin.

It is further known to machine crankpins with the end face of a milling cutter that moves slowly along a circular path the center of which is situated in the axis of the crankpin which is located in a manner similar to the case with the known Moll apparatus referred to above.

There is also known a method of machining crankpins by grinding operations, which are carried out with an end face of a cylindrical grinding tool. The crankshaft is slowly rotated during the grinding thereof and a pair of equal crankshafts are simultaneously rotated synchronously, guiding a milling head with a milling spindle so that a milling tool is in permanent engagement with the surface of the rotating crankpin.

All of the known methods of machining crankpins as well as other parts of crankshafts thus have a large number of drawbacks. The machines used are extremely complicated, costly to manufacture, and have a low output capacity. The tools required are expensive and must be specially made for the purpose of machining crankshaft structures. In addition, the maintenance of these tools is undesirable expensive.

SUMMARY OF THE INVENTION

It is accordingly a primary object of the present invention to provide a method for machining crankpins and other parts of crankshafts, which will avoid the above drawbacks.

More specifically, it is an object of the invention to provide a method particularly suited for machining crankshafts of intermediate, large and extremely large sizes.

Another object of the invention is to provide a method which can conveniently be used not only for machining crankpins but also for machining crank arms and journals.

An important object of this invention resides in providing a method which will have a far larger output capacity than has heretofore been possible, with a relatively deep and larger chip being cut from the work during each cutting operation so as to achieve a substantial reduction in the operating time.

A further object of the invention is to provide a method which can use universal horizontal or vertical milling machines for the milling of crankshafts, so that special and costly machines of low output capacity need not be used.

Still another object of the invention is to provide a machine of general utility, capable of being used for milling not only crankpins but also journals and arms of crankshafts so that there is no requirement to transfer the work from one machine tool to another.

It is also an object of the invention to provide a method according to which a pair of crank arms can be simultaneously milled so as to reduce by half the time required for milling the crank arms.

According to the invention, a crankpin which is to be machined is rotated about a given axis that is parallel to the axis of the crankpin. A milling cutter is maintained in engagement with the crankpin and is rotated synchronously therewith while the milling cutter is simultaneously rotated about its own axis so as to effect machining of the crankpin. The milling cutter preferably has a cutting end face which is in a plane perpendicular to the axis of the cutter. It is this cutting end face which is maintained in engagement with the crankpin, with the axis of the milling cutter extending perpendicularly to the axis of the crankpin and initially displaced beyond the axis of the crankpin during a rough cutting operation so that it is primarily the periphery of the cutting end face of the milling cutter which effects the rough cut. A finish cutting operation is carried out by displacing the axis of the milling cutter to a location where it extends perpendicularly across and intersects the axis of the crankpin so that in this way the finish cutting operations can be carried out. The milling cutter has a cylindrical side cutting surface which may be used for machining the inner side surfaces of a pair of crank arms which carry the crankpin.

BRIEF DESCRIPTION OF THE DRAWINGS

The invention is illustrated by way of example in the accompanying drawings which form part of this application and in which.

DESCRIPTION OF PREFERRED EMBODIMENTS

Figure 7:
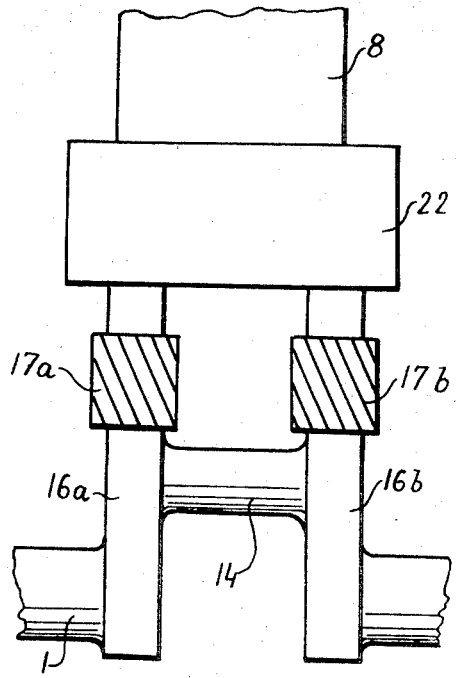
FIG. 7 is a schematic representation of the manner in which a pair of milling cutters may be used for simultaneously machining the peripheries of a pair of arms.
Figure 8:
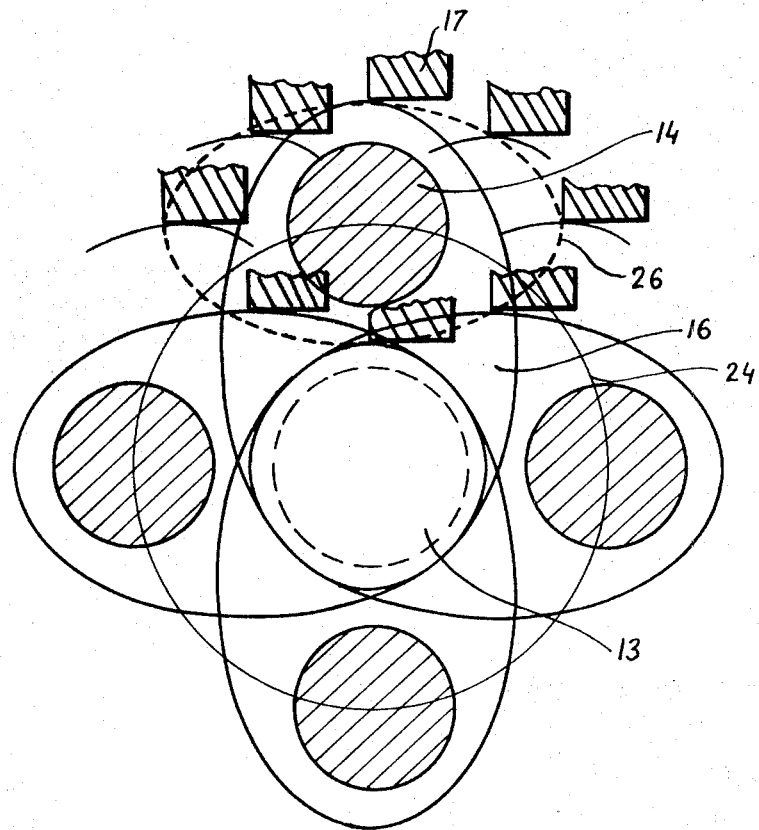

FIG. 8 is a schematic side elevation illustrating the manner in which the milling cutters of FIG. 7 are displaced during machining of the peripheries of the crank arms.

Figure 1:
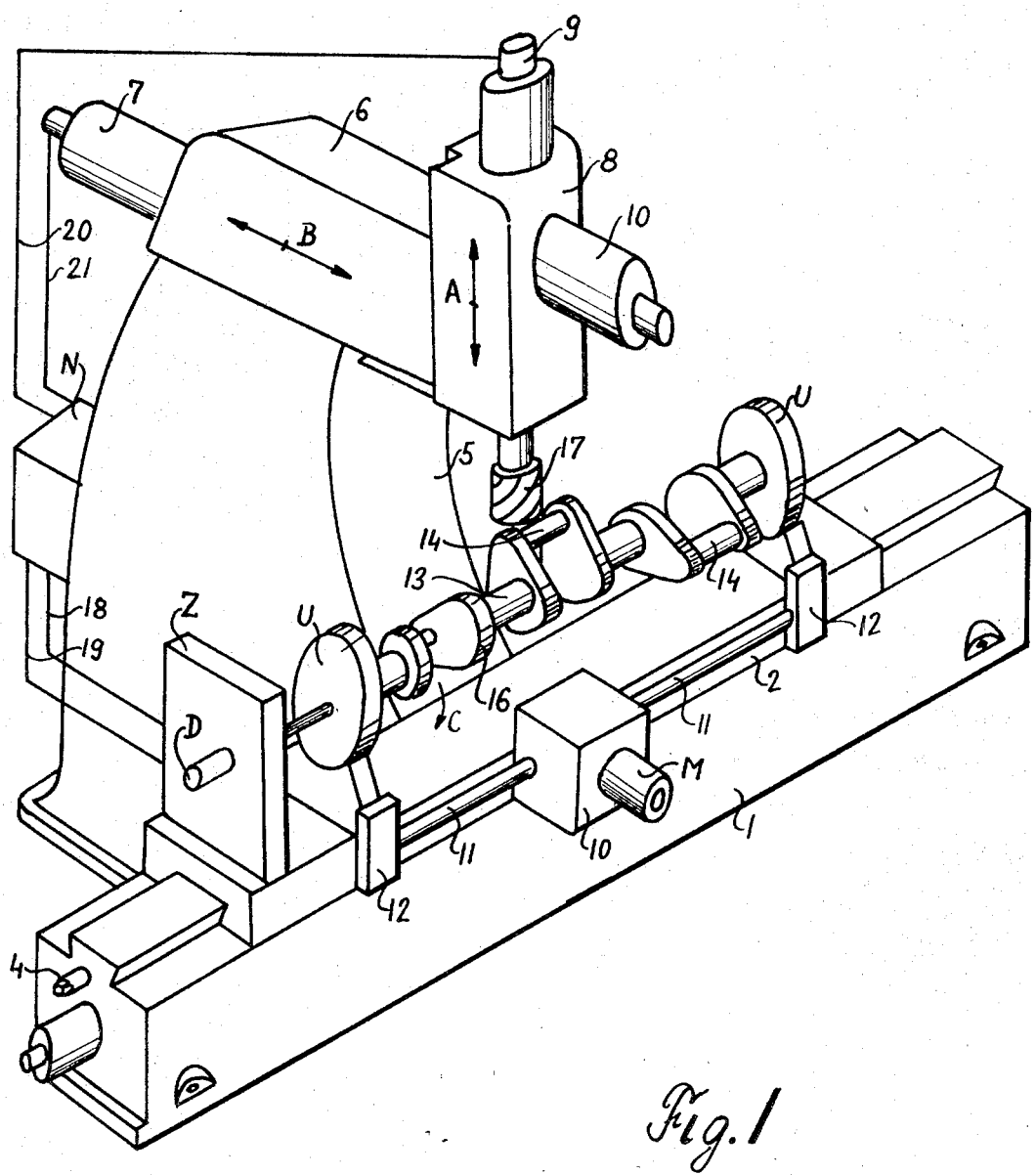
FIG. 1 is a schematic perspective illustration of one possible embodiment of a milling machine which may be used to practice the method of the invention.

The method of the present invention can be carried out on a general purpose vertical milling machine of the type schematically indicated in FIG. 1, although it is also possible to perform the method of the invention on a general purpose horizontal milling machine.

The milling machine illustrated in FIG. 1 includes a worktable 2 supported on the ways of a base or frame 1 for movement to the left and right in a horizontal direction. The movement of the table 2 along the ways of the base 1 is brought about by an electric motor 3 or manual turning of a screw 4.

The frame includes a rear stand 5 which extends upwardly from the lower frame portion that carries the table 2. This rear stand 5 supports at its top end a carriage 6 which moves horizontally both forwardly and rearwardly in a direction perpendicular to the direction of the horizontal movement of the table 2, the double-headed arrow B indicating the directions of movement of the carriage 6. The displacement of the carriage 6 is brought about by way of a servomotor 7 which, for example, turns a rotary screw with respect to a stationary nut so as to bring about the required displacement of the carriage 6.

The carriage 6 itself carries at its front end a vertically movable carriage 8 capable of moving up and down in the directions of the double-headed arrow A and is driven by a servomotor 9, the vertical carriage 8 being guided along suitable ways situated at the front end of the carriage 6 while the carriage 6 is guided along suitable ways provided at the top end of the stand 5.

The drive for rotating the cutting tool 17 is taken from a driving motor 10 carried by the carriage 8. The motor 10 will rotate, through a suitable transmission, the spindle carrying the cutting tool 17.

In order to support the crankshaft 13, the ends thereof are fixedly clamped by a pair of rotary chucks U mounted on the table 2 and driven through transmissions 12 which in turn are actuated by a shaft 11. The shaft 11 is driven from a transmission 110 which, in turn, is driven by a feed motor M so that through this construction the crankshaft 13 will be slowly rotated in a clockwise direction, when seen from the left of FIG. 1, the arrow C indicating the direction of rotation of the crankshaft.

The rotary movement of the crankshaft 13 is sensed by a known device Z which resolves the circular movement into a pair of mutually perpendicular rectangular coordinates, the device Z being actuated by the left chuck U, as viewed in FIG. 1. The horizontal and vertical components thus determined by the device Z are electrically transmitted in the form of suitable signals through conductors 18 and 19 to an amplifier N. The amplifier N is connected, as is schematically shown in FIG. 1, through suitable conductors 20 and 21 to the servomotor 9 and 7, respectively, so that the signal, properly amplified, is transmitted to the servomotors for actuating the latter to bring about the movements of the carriages 6 and 8 in a manner which will maintain the cutter 17 in engagement with the work during its rotation around the axis of the crankshaft 13, as described in greater detail below.

In addition, a correcting device D is provided in order to correct mechanically or otherwise the track which is traced by the milling cutter 17 so as to use the circular motion of the crank arms 16 in order to determine for the milling cutter 17 a path that will properly machine the peripheries of the crank arms. In the case in which the crank arms which carry the crankpins 14 are machined at their peripheries, the device D is used to correct the signals before they are transmitted to the amplifier and servomotors so that in this way a suitable movement of the milling cutter is achieved, as will be explained in greater detail further below. The movement of the cutter 17 derived by way of movements of the carriages 6 and 8 is such as to maintain the cutter 17 turning in synchronism with the crankpin 14, also as described below. The movements of the carriages 8 and 6 (see the arrows A and B), are corrected by the device D in the case of machining the peripheries of the crank arms 16.

Figure 2:
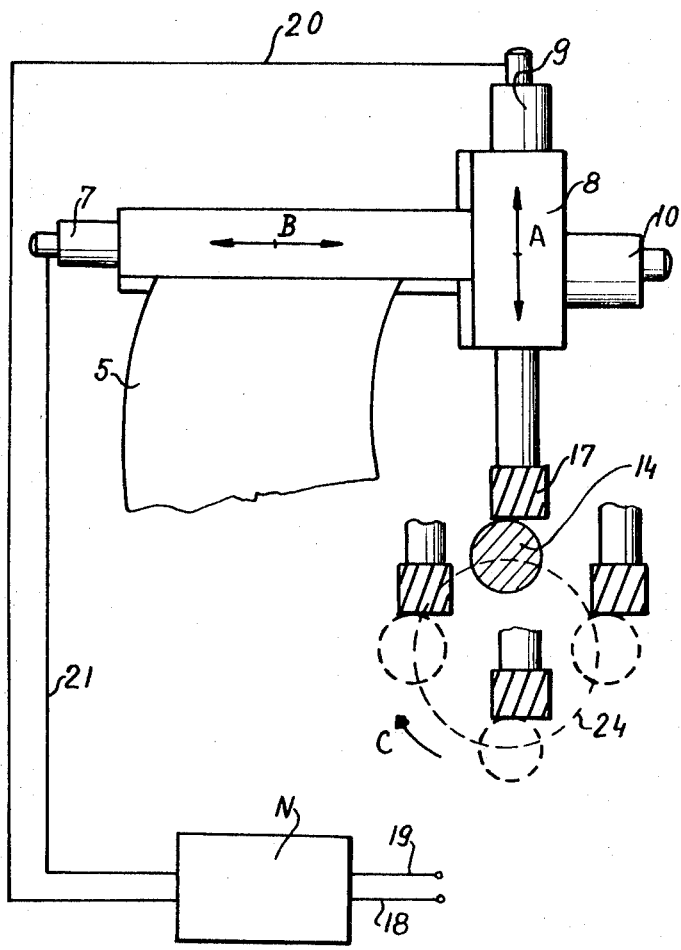
FIG. 2 is a schematic side elevation illustrating the operations carried out during the machining of a crankpin with the machine of FIG. 1.

The manner in which the structure of FIG. 1 operates according to the method of the invention for machining each crankpin 14 is apparent from FIG. 2. As each crankpin 14 is turned by the chucks around the axis of the crankshaft 13, coinciding with the common axis of the journals thereof, the carriages 6 and 8 are moved in the directions B and A, respectively, so that the cutter 17 turns snychronously with each crankpin to remain in engagement therewith. At the same time the spindle is driven by the motor 10 and the cutter 17 is driven around its own axis to effect the cutting operations.

In the case of the milling of the peripheries of the crank arms 16, it is desirable to attach to the carriage 8 a milling head 22 having a pair of spindles for carrying a pair of cutters 17a and 17b, as shown in FIG. 7, so that in this way the pair of arms 16a and 16b can be simultaneously machined, thus reducing the operating time in half.

Figure 3:
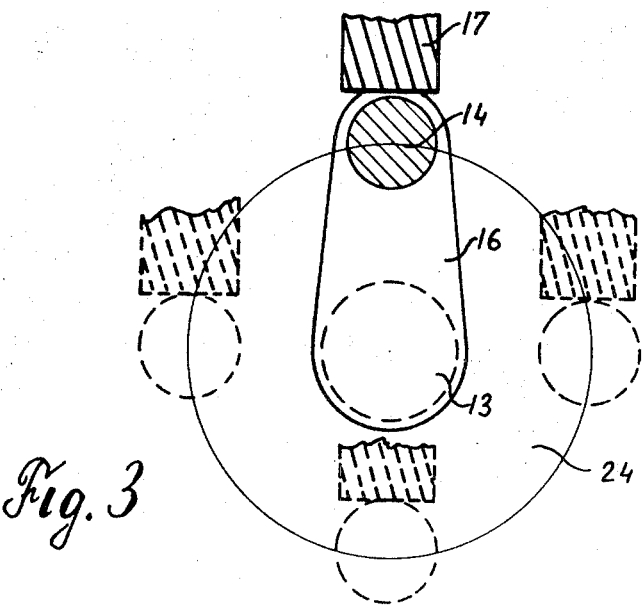
FIG. 3 schematically represents various stages during the machining of a crankpin.

Considering first the machining of a crankpin 14, the milling cutter 17 has a circular end face situated in a plane normal to the spindle axis, which end face engages the pin 14 in order to machine the latter. The engagement of the end face of the cutter 17 with the pin 14 is clearly shown in FIG. 3. It is shown how the pin 14 is turned along a circle 24 around the axis of the crankshaft 13.

Figure 4:
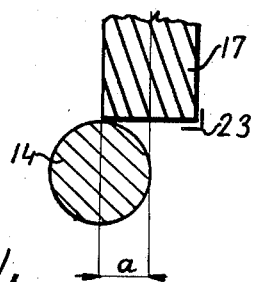
FIG. 4 illustrates the relative positions between a crankpin and milling cutter during an initial rough cutting operation.

The machining of each crankpin 14 is carried out, in accordance with the method of the invention, in a pair of operations the first of which is a rough cutting operation, the second being a finish cutting operation. FIG. 4 illustrates the relative position between the crankpin 14 and the cutter 17 during the rough cutting operation. At this time the rotary axis of the milling cutter, which at all times extends perpendicular to the axis of the crankpin 14, is displaced beyond the latter axis by the distance $a$ so that it is only the peripheral region 23 of the end face of the milling cutter 17, which engages the work 14 in order to machine the latter. In this way the efficiency of the cutting action is enhanced, and it is possible to take an extremely large cut in a single cutting operation.

Figure 6:
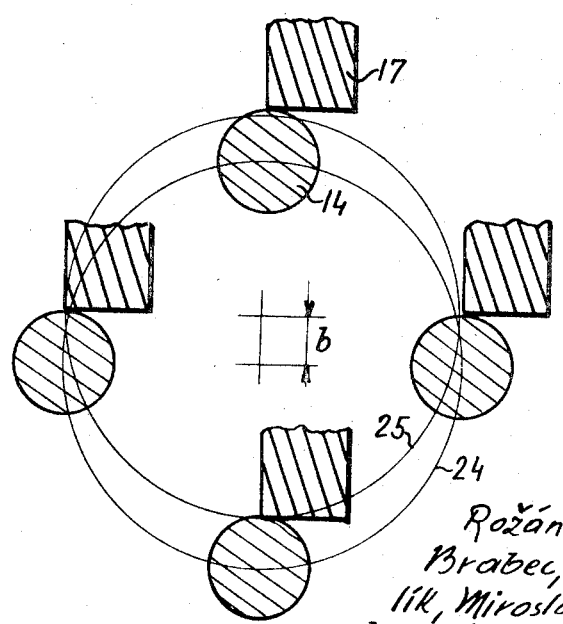
FIG. 6 is a diagrammatic representation of the manner in which the milling cutter and crankpin are positioned with respect to each other so as to determine the diameter to which the crankpin is machined.

After the crankshaft has been turned through one revolution, with the cutter 17 turning in synchronism therewith, the rough cutting operation is completed. This operation is shown in detail in FIG. 6 which shows a circle 25 traversed by the cutter 17 in synchronism with the turning of the crankpin 14 along the circle 24. The center of the circle along which the cutter 17 is moved is displaced from the center of the circle along which the pin 14 is moved by the distance $b$. Thus, it is this distance which determines the diameter of the pin 14.

Figure 5:
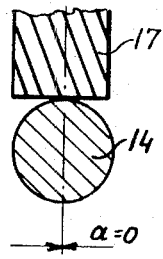
FIG. 5 illustrates the relative positions between a crankpin and milling cutter during a finish cutting operation.

Due to the fact that during the rough cutting operation it is only the periphery of the cutter, which engages the crankpin, relatively large rounded parts of the initial crankpin will remain between the crank arms and the central machined portion of the crankpin. During the finish cutting operation the axis of the cutter is displaced to the position indicated in FIG. 5 where it extends perpendicularly across and intersects the axis of the crankpin 14, so that at this time during the next rotation of the crankpin and cutter through a full revolution through the axis of the crankshaft the entire crankpin will have a finish machining operation provided circumferentially around its axis. In this way the machining of the crankpin is completed.

In the case where the diameter of the cutter is equal to the distance between the arms 16, the sides of the cutter can simultaneously cut the inner side surfaces of the arms. However, where the arms 16 are displaced from each other by a distance greater than the diameter of the cutter 17, it is possible to shift the cutter 17 horizontally between the arms so as to machine the latter.

During the rotary movement of the crankshaft, the left chuck U of FIG. 1, which is connected to the device Z to constantly transmit rotary movement to the latter, sends to the device Z a signal corresponding to the speed of rotary movement of the work. The rotary movement is resolved in the device Z mechanically, electrically or in any other suitable way into rectangular, mutually perpendicular components used to determine the speed and extent of movement of the carriages 6 and 8. This device Z may, for example, have the construction disclosed in U.S. Pat. application No. 720,737 of Blazek et al., filed Apr. 11, 1968, now U.S. Pat. No. 3,475,973 and entitled APPARATUS FOR ANALYZING A ROTARY MOTION.

The signals which leave the device Z may have the form of electrical impulses corresponding to the mutually perpendicular components and supplied by the conductors 18 and 19 into the amplifier N, which may, for example, be an electron tube amplifier. The amplified signals are delivered to the servomotors 7 and 9 to control the movements of the carriages 6 and 8. This movement is such that the cutting tool also executes a circular movement in synchronism with the crankpin along the circle 25. In order to control the diameter of the machined crankpin 14 it is only necessary to adjust the distance $b$ indicated in FIG. 6.

In order to machine the journals, it is only necessary to stop the rotary movement of the milling cutter with the crankpin and to place it in engagement with a crankshaft journal while the crankshaft is again rotated about its axis. In this manner it is possible to machine the journals with the same milling cutter on the same machine, without transferring the work to another machine, simply by providing a proper feeding speed for the work.

When using the method of the invention for milling the arms 16 at their peripheries, the coordinates or components achieved by way of the device Z are corrected by the additional device D. The latter device rotates simultaneously with the crankshaft 13 but is provided with a suitable shaped cam, form plate, or the like, determined by the desired configuration of the crank arms which will have a substantially elliptical configuration, as is well known. The signals which are thus corrected by the device D are then transmitted to the amplifier from where the signals are again transmitted to the servomotors 7 and 9. In this case the milling cutter does not carry out a circular movement 25 but instead a corrected elliptical path of movement 26 most clearly shown in FIG. 8. The path 26 will be determined by the desired or required shape of the crank arms 16. The shape of the correction elements in the form of cams, form plates, or the like is determined in accordance with the desired shape of the arms 16. The corrected path of movement 26 of the milling cutter is synchronized with the circular movement 24 along which the crankpin 14 and crank arms 16 turn. In this case the end cutting face of the milling cutter is in permanent tangential engagement with the peripheral surface of the crank arms 16, as shown in FIG. 8.

In order to improve the cutting action the axis of the milling cutter is, for rough machining purposes, also shifted to one side to provide cutting by the peripheral region 23 of the cutting end face and to achieve in this way a high cutting capacity. The correction of the path of the milling cutter can also be achieved in such a way that the values of the required components or coordinates are supplied to a counter which executes a correction according to a predetermined program.

To increase the output which can be achieved according to the method of the invention in connection with the machining of the peripheries of the crank arms, the milling head 22 is used in the manner indicated in FIG. 7. This head has a pair of rotary milling spindles carrying the pair of cutters 17a and 17b which simultaneously machine the peripheries of a pair of arms 16a and 16b in the manner shown in FIG. 8, so that a 50 percent increase in the output can accordingly be achieved. The distance between the parallel axes of the cutters 17a and 17b equals the distance between the pair of arms 16a and 16b.

Although the various operations on the journals, arms, and crankpins can be carried out in any desired sequence, it is preferred to repeat the working of the crankpins 14 or arms 16 after the working of one pin and of the arms which carry the same as frequently as is required by the number of crankpins and arms which are on the crankshaft.

It is also possible to provide a machine with a plurality of milling spindles which, after a basic correction determined by the angular displacement of the several crankpins one with respect to the next, can all be simultaneously operated in the manner described above to achieve a simultaneous machining of the several crankpins and the arms which carry the same.

The method of milling of the invention can be used not only for the working of crankpins and their arms but also for the working of crankpins of shafts of eccentric presses and crankshafts of compressors, and further for any work where a cylindrical crankpin is displaced from the rotation axis of the crank.

Thus, with the method of the invention the crankshaft is slowly rotated about its axis and the end face of the cylindrical milling cutter is applied thereto while rotating in synchronism therewith. The milling cutter is moved in synchronism along a circular path the diameter of which equals the diameter of the circle along which the crankpin is turned.

Instead of the device Z, it is possible to use a suitable program control making use of a computer or the like in order to determine the required movements of the carriages 6 and 8 to bring about the synchronizing of the movement of the cutter with the work.

The same machine is used to machine not only crankpins but also journals, and crank arms. The work need not be moved from one machine to another. Also, the machine used according to the method of the invention is of general utility.

In addition to correcting the movement of the cutter for machining the peripheries of crank arms either by a mechanical cam, form plate, or the like, it is possible to use methods employing hydraulic, pneumatic, or electronically derived corrections, or combinations thereof.

Thus, with the invention a general all-purpose machine tool is used without in any way altering the referred to general purpose character of the machine tool. In addition, production time is considerably reduced, and a further advantage is achieved in part by the possibility of taking a relatively large cut during a single operation. Moreover, the milling cutters themselves are conventional cylindrical milling cutters having a cutting end face perpendicular to the axis of the cutter so that simple inexpensive cutters can be used to practice the method of the invention. The maintenance and sharpening of such cutters are much easier and less expensive to carry out than in the case of special cutters of the type referred to above.

We claim:

1. In a method of machining a crankpin, the steps of rotating the crankpin about an axis parallel to the axis of the crankpin, providing means for driving a milling cutter in a vertical and a horizontal direction synchronously with the rotation of the crankpin, sensing the rotation of the crankpin, resolving the rotation thereof into a vertical and horizontal component, driving the milling cutter in response to the resolved vertical and horizontal components to move the milling cutter in a path approximating a circle about a center displaced from the axis of rotation of the crankpin, maintaining said milling cutter in engagement with the crankpin during rotation thereof and rotating the milling cutter simultaneously about its own axis with the latter axis extending perpendicularly with respect to the axis of the crankpin so that the milling cutter machines the crankpin simultaneously with the rotary movement of the latter.

2. In a method as recited in claim 1 and wherein the center of a circle along which the milling cutter rotates in synchronism with the crankpin is displaced from the center of the circle around which the crankpin rotates by a selected distance which will determine the diameter to which the crankpin is milled.

3. In a method as recited in claim 2 and wherein said milling cutter has a cutting end face located in a plane perpendicular to the axis of the milling cutter and engaging the crankpin to mill the latter, said milling cutter being positioned first with respect to the crankpin to carry out a rough cut and then with respect to the crankpin to carry out a finishing cut, the axis of the milling cutter being displaced beyond and extending perpendicularly to the axis of the crankpin to an extent providing only engagement of the periphery of the milling cutter with the crankpin during the rough cutting of the operation, the axis of the milling cutter passing through and intersecting the axis of the crankpin during the finished cutting operation.

4. In a method as recited in claim 3 and wherein said crankpin forms part of a crankshaft and is situated between and carried by a pair of crank arms, the step of machining inner surfaces of the crank arms with the milling cutter by applying a cylindrical side cutting surface thereof to the inner side surfaces of the crank arms.

5. In a method as recited in claim 1 and wherein said crankpin forms part of a crankshaft having journals, the step of machining a journal at a time different from the machining of the crankpins while terminating the rotary movement of the milling cutter and maintaining the latter in engagement with the journal during simultaneous rotation of the journal about its axis.

6. In a method as recited in claim 1 and wherein said crankpin forms part of a crankshaft which has a pair of crank arms carrying the crankpin, the step of machining each crank arm at its periphery with the milling cutter while displacing the milling cutter along an elliptical path simultaneously with the rotation of each crank arm about the axis of the crankshaft.

7. In a method as recited in claim 6 and wherein a pair of milling cutters are simultaneously placed in engagement with the periphery of the pair of arms which carry the crankpin for simultaneously machining the peripheries of the pair of arms.

8. In a method as recited in claim 1 wherein the milling cutter is driven by an electric motor and includes the steps of converting the vertical and horizontal components into electrical signals and transmitting the signals to the motor.

9. In a method as recited in claim 1 including the step of maintaining the angular movement of the milling cutter equal to the angular movement of the crankpin.